US011254442B2

(12) United States Patent
Chengalva (10) Patent No.: US 11,254,442 B2
(45) Date of Patent: Feb. 22, 2022

(54) LOGIC CONTROL FOR AUTONOMOUSLY AND MANUALLY LOCKING OVERHEAD BINS FOR ENHANCED SAFETY

(71) Applicant: The Boeing Company, Chicago, IL (US)

(72) Inventor: Mahesh Chengalva, Bothell, WA (US)

(73) Assignee: THE BOEING COMPANY, Chicago, IL (US)

(*) Notice: Subject to any disclaimer, the term of this patent is extended or adjusted under 35 U.S.C. 154(b) by 379 days.

(21) Appl. No.: 16/397,223

(22) Filed: Apr. 29, 2019

(65) Prior Publication Data

US 2020/0339276 A1 Oct. 29, 2020

(51) Int. Cl.
*B64D 45/00* (2006.01)
*B64D 11/00* (2006.01)

(52) U.S. Cl.
CPC ............ *B64D 45/00* (2013.01); *B64D 11/003* (2013.01); *B64D 2045/008* (2013.01); *B64D 2045/0085* (2013.01)

(58) Field of Classification Search
CPC ...................................................... B64D 45/00
See application file for complete search history.

(56) References Cited

U.S. PATENT DOCUMENTS

| 5,441,218 A | 8/1995 | Mueller et al. | |
| 5,456,529 A | 10/1995 | Cheung | |
| 7,802,826 B2 | 9/2010 | Schmitz et al. | |
| 8,665,119 B2* | 3/2014 | Hashberger | E05B 47/0607 340/945 |
| 8,876,050 B2* | 11/2014 | Wentland | B64D 11/04 244/129.4 |
| 9,745,064 B2* | 8/2017 | Balasubramanian | B64D 11/003 |
| 10,429,856 B2* | 10/2019 | Guedes | B64D 45/00 |
| 10,766,627 B2* | 9/2020 | Hehn | B64D 31/06 |
| 2008/0078871 A1* | 4/2008 | Munson | E05B 47/02 244/118.5 |
| 2013/0290221 A1 | 10/2013 | Jindel | |
| 2017/0369190 A1* | 12/2017 | Ethington | B64D 45/00 |
| 2018/0179786 A1* | 6/2018 | Johnson | G08B 25/10 |
| 2019/0202570 A1* | 7/2019 | Smith | B64D 45/00 |
| 2020/0269983 A1* | 8/2020 | Berkenhoff | B64D 11/003 |
| 2020/0339276 A1* | 10/2020 | Chengalva | B64D 11/003 |

FOREIGN PATENT DOCUMENTS

WO 2017178078 A1 10/2017

* cited by examiner

*Primary Examiner* — Michael A Berns
(74) *Attorney, Agent, or Firm* — Coats & Bennett, PLLC (57) ABSTRACT

A control system and method of controlling access to storage bins in a vehicle. The system includes a lock configured to be selectively movable between a locked position to prevent access to an interior of the storage bins and an unlocked position to allow access to the interior of the storage bins. A switch is positioned in a cabin of the vehicle. A control circuit is configured to determine an operational status of the vehicle and selectively position the locks. The control circuit can also receive an override signal from the switch and unlock the locks in certain situations.

20 Claims, 7 Drawing Sheets

LOGIC CONTROL FOR AUTONOMOUSLY AND MANUALLY LOCKING OVERHEAD BINS FOR ENHANCED SAFETY

TECHNOLOGICAL FIELD

The present disclosure relates generally to the field of control functions for a vehicle, and more specifically, to control for locking storage bins on a vehicle.

BACKGROUND

Vehicles that transport people, such as aircraft, buses, and trains, typically include storage bins located near the passenger seats. The storage bins are sized to hold the passenger's personal items such as small suitcases, jackets, briefcases, etc. Airplanes, for example, have closable storage bins located above the passenger seats for securing their personal items.

Passengers are able to access the storage bins at various times. This can include when the passenger initial enters the vehicle and locates their seat. The passenger places their personal items in the storage bins prior to sitting down in their seat. During the trip, the passengers may be able to access the storage bins under normal conditions, such as during an airplane trip when the flight is smooth and the seatbelt sign is off. The passengers can also access the storage bins to remove their personal items upon exiting the vehicle.

There are situations that can occur when the storage bins should not be accessed. This can include when the vehicle is involved in an event when it is necessary to quickly exit the vehicle. The passengers should disregard their personal items and instead just exit the vehicle for their own safety and the safety of other passengers. There have been numerous instances when during an emergency evacuation of a vehicle passengers have retrieved their personal items from the storage bins prior to exiting. This blocks the emergency exits and slows other passengers from exiting the vehicle.

SUMMARY

One aspect is directed to a system to control access to storage bins in a vehicle. The system includes a lock configured to be selectively movable between a locked position to prevent access to an interior of the storage bins and an unlocked position to allow access to the interior of the storage bins. A switch is positioned in a cabin of the vehicle. Control circuitry is configured to: determine an operational status of the vehicle; lock the storage bins based on the operational status of the vehicle; after locking the storage bins, receive an override signal from the switch; in response to receiving the override signal from the switch, maintain the storage bins in the locked position when the operational status meets a predetermined criteria; and in response to receiving the override signal from the switch, unlock the storage bins when the operational status does not meet the predetermined criteria.

In one aspect, sensors are positioned within the vehicle to sense one or more conditions of the vehicle and the control circuitry receives signals from the sensors and determines the operational status of the vehicle.

In one aspect, the control circuitry determines that the operational status meets the predetermined criteria upon determining the operational status of the vehicle as one of a power failure, a water landing, and a sudden decrease in speed.

In one aspect, the control circuitry determines that the operational status does not meet the predetermined criteria upon determining the operational status of the vehicle as one of turbulence, landing gear deployment during flight, seat belt sign activation, and detection of a fire.

In one aspect, crew bins are positioned in the vehicle that remains unlocked when the lock is in the locked position.

In one aspect, a flight control system controls the vehicle and determines the operational status of the vehicle and transmits the operational status of the vehicle to the control circuitry.

One aspect is directed to a system to control access to storage bins in a vehicle. The system includes a lock is selectively movable between a locked position to prevent access to an interior of the storage bins and an unlocked position to allow access to the interior of the storage bins. A switch is positioned in a cabin of the vehicle. Control circuitry determines whether an operational status of the vehicle is in a first state or a second state. The control circuitry positions the lock in the unlocked position when the operational status is not in the first state or the second state. The control circuitry positions the lock in the locked position when the operational status is in the first state regardless of an unlock input being received from the switch. The control circuitry positions the lock in the unlocked position when the operational status is in the second state and an unlock input has been received from the switch.

In one aspect, sensors are positioned within the vehicle to sense conditions of the vehicle and the control circuitry receives signals from the sensors and determines the operational status of the vehicle.

In one aspect, the control circuitry determines that the operational status is in the first state upon determining an occurrence of a power failure, a water landing, and a sudden decrease in speed.

In one aspect, the control circuitry determines that the operational status is in the second state upon determining an occurrence of turbulence, landing gear deployment during flight, seat belt sign activation, and detection of a fire.

In one aspect, a flight control system controls the vehicle and determines the operational status of the vehicle and transmits the operational status to the control circuitry.

One aspect is directed to a method of selectively locking storage bins on a vehicle. The method includes: receiving one or more inputs regarding conditions of the vehicle; locking the storage bins based on an operational status of the vehicle and thereby preventing access to an interior of the storage bins; after locking the storage bins, receiving an override input; in response to receiving the override input, maintaining the storage bins locked when the operational status meets a predetermined criteria; and in response to receiving the override input, unlocking the storage bins when the operational status does not meet the predetermined criteria thereby allowing access to the interior of the storage bins.

In one aspect, the method includes initially unlocking the storage bins prior to receiving the one or more inputs.

In one aspect, receiving the one or more inputs regarding the operational status of the vehicle includes receiving signals from sensors within the vehicle indicative of the operational status of the vehicle.

In one aspect, the predetermined criteria includes determining a water landing.

In one aspect, the predetermined criteria includes determining a g-load force that is greater than a predetermined threshold.

In one aspect, the predetermined criteria includes determining a fire on board the vehicle.

In one aspect, the predetermined criteria includes determining detection of an aborted takeoff.

In one aspect, locking the storage bins includes signaling locks on the storage bins to move to a locked orientation.

In one aspect, the method includes receiving the one or more inputs regarding an operational status of the vehicle from a flight control system that controls an overall operation of the vehicle.

DETAILED DESCRIPTION

Figure 1:
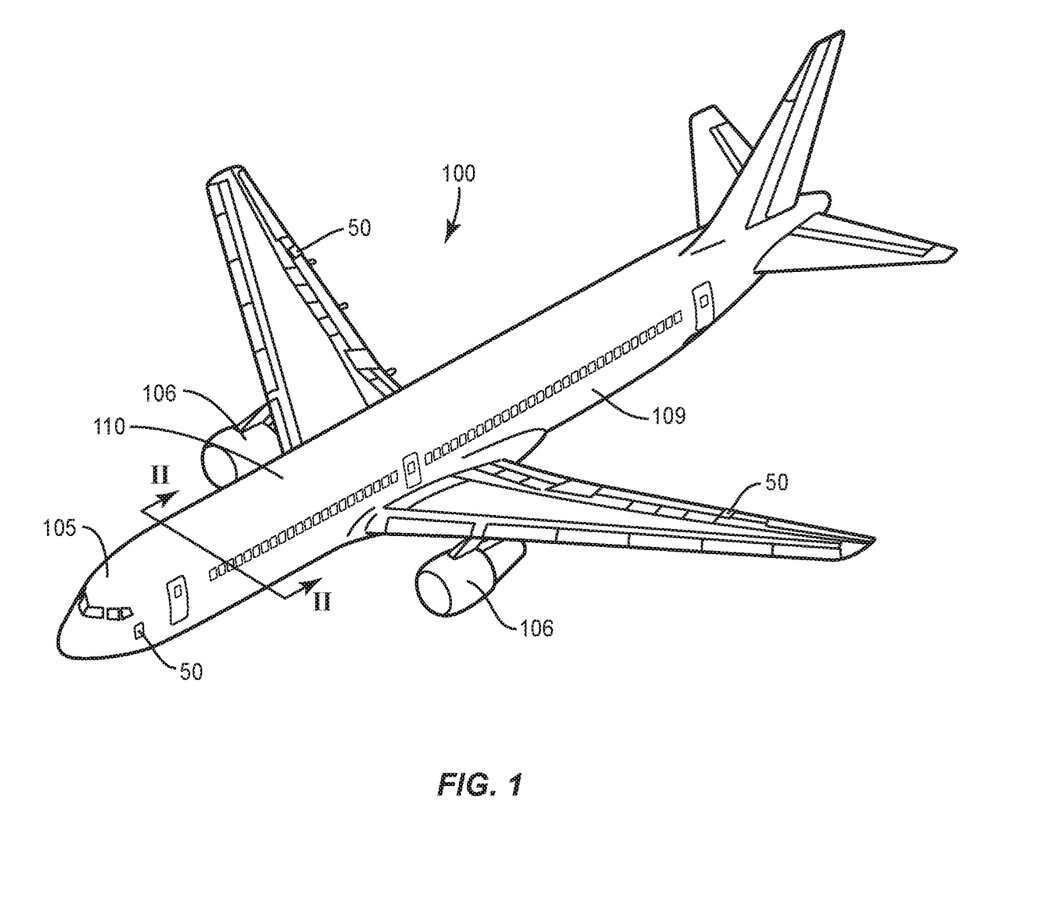
FIG. 1 is a perspective view of an aircraft.

FIG. 1 illustrates a vehicle 100, specifically an aircraft 100. The aircraft 100 includes a fuselage 109 with an interior cabin 101 to carry passengers. The cabin 101 can extend along a majority of the length of the fuselage. A cockpit 105 is positioned at the front of the fuselage 109. A cargo hold 104 can extend within the lower section of the fuselage 109 to carry larger passenger items (e.g., larger suitcases, boxes) as well as various other cargo.

Figure 2:
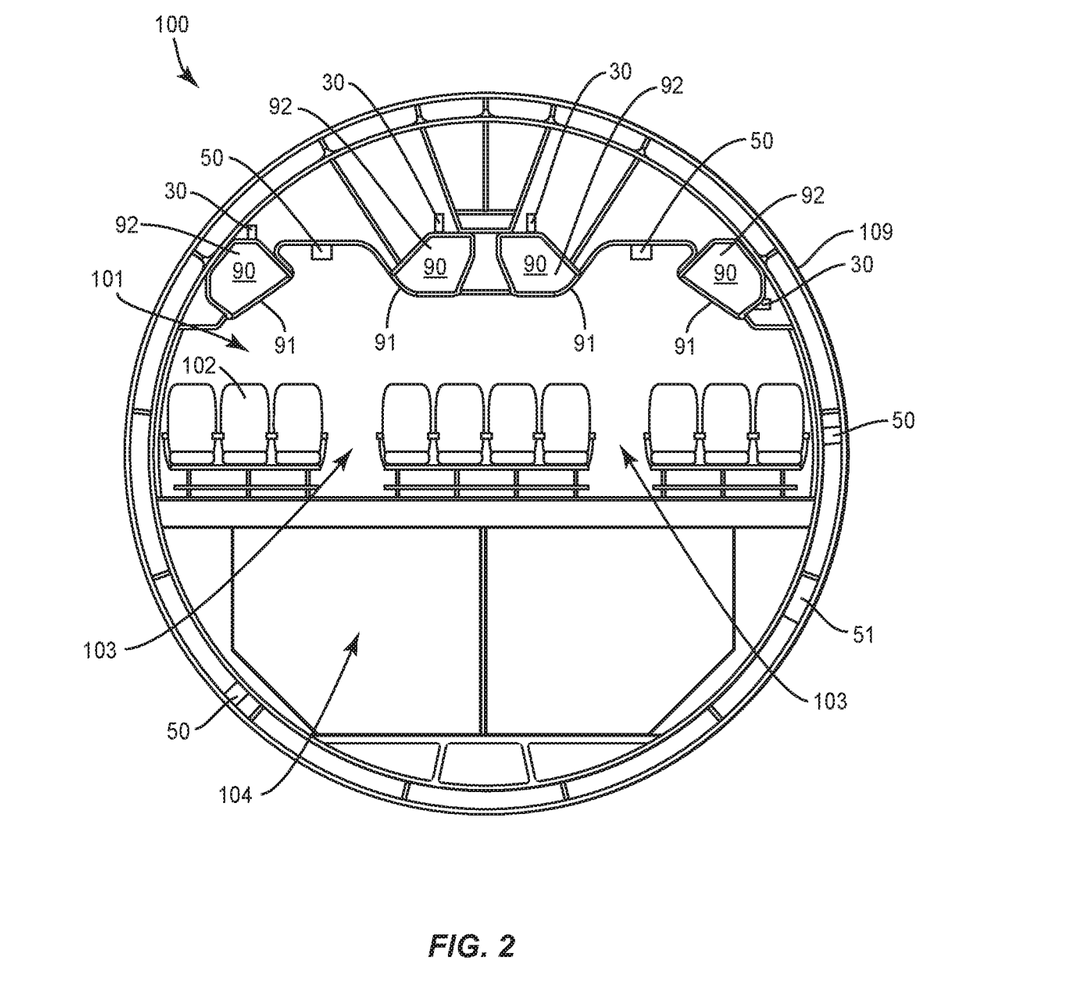
FIG. 2 is a section view of the aircraft cut along line II-II of FIG. 1.

FIG. 2 is a cross-sectional, schematic view of the fuselage 109 and the interior cabin 101 for the passengers. Seats 102 are spaced across the width and length of the cabin 101. One or more aisles 103 are formed between the seats 102 and can extend along the length of the cabin 101. The aisles 103 provide pathways for the passengers to enter and exit the vehicle 100, and move about the cabin 101 during flight.

Storage bins 90 are positioned in proximity to the seats 102 to hold the personal items of the passengers. The storage bins 90 include an interior space 92 with doors 91. The doors 91 are movable between a closed position that extends across and encloses the interior space 92 as illustrated in FIG. 2. The doors 91 can also be moved to an open position to allow access to the interior space 92.

Locks 30 are configured to lock the doors 91 in the closed position to prevent access to the interior space 92. Each storage bin 90 can include a separate lock 30 to individually lock the storage bin 90. Additionally or alternatively, locks 30 can be configured to lock two or more of the storage bins 90. The locks 30 can also be unlocked to allow the doors 91 to move to the open position.

Figure 3:
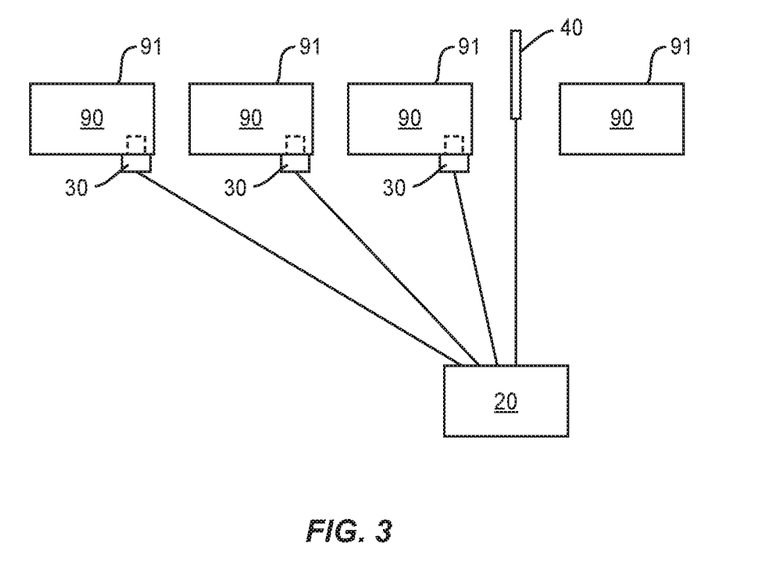
FIG. 3 is a schematic diagram of control system that includes control circuitry that receives signals from a switch and controls locks positioned at storage bins.

FIG. 3 illustrates storage bins 90 that are each equipped with a lock 30. The locks 30 are selectively movable between a locked position (as illustrated in solid lines) to prevent the corresponding door 91 from moving from the closed position to the open position. The locks 30 can also be moved to the unlocked position (as illustrated in dashed lines) for unlocking the doors 91 and allowing access to the interior of the storage bins 90. In another design (not illustrated), a single lock 30 is configured to prevent doors 91 on two or more of the storage bins 90 from moving from the closed position to the open position.

One or more switches 40 are positioned in the cabin 101 to activate the locks 30. The switches 40 can be positioned for the crew to activate and lock the storage bins 90 during an event. In one design, multiple switches 40 are spaced apart along the length of the cabin 101 to provide access to the crew. The one or more switches 40 can be mechanical switches, such as a lever arm that pivots between locked and unlocked positions. In another design, the switches 40 include a keypad, touch screen, joystick, and other like device to enter commands through an on-screen input device. In designs with multiple switches 40, the switches 40 can be the same or different. The one or more switches 40 signal control circuitry 20.

One or more of the storage bins 90 may not be equipped with a lock 30. These one or more storage bins 90 can be used for supplies for the crew, emergency supplies, etc. that may need to be accessed during an event. These one or more storage bins 90 remain unlocked and accessible when the remainder of the storage bins 90 used for passenger's personal items are locked.

Figure 4:
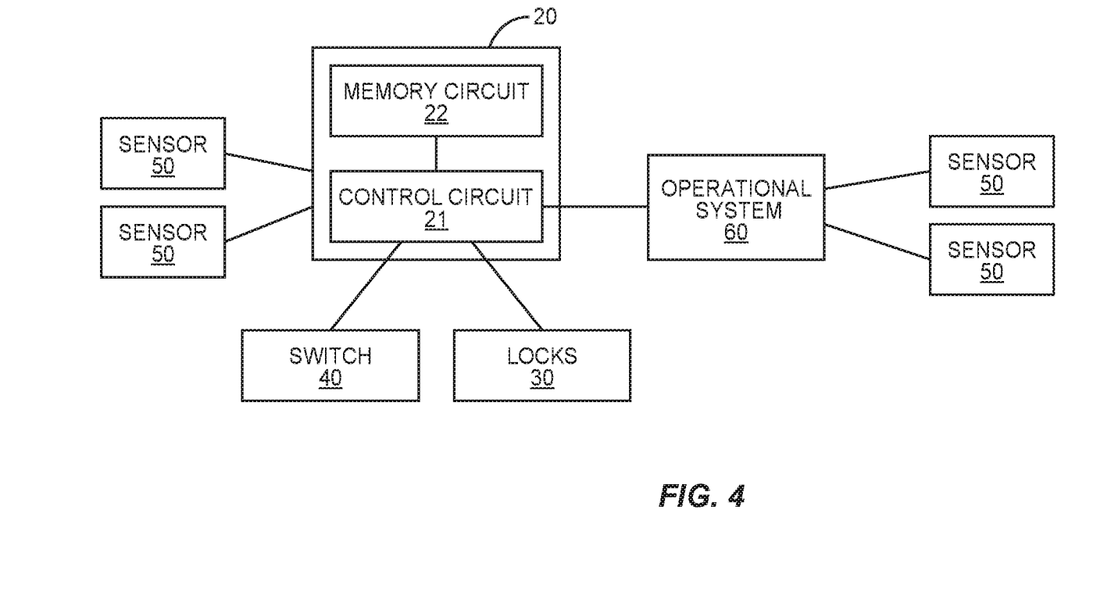
FIG. 4 is a schematic diagram of a control system for controlling access to storing items on an aircraft.

As illustrated in FIG. 4, the control circuitry 20 receives a signal from the one or more switches 40 and controls the one or more locks 30. The control circuitry 20 includes one or more processing circuits 21 that can include one or more microprocessors, Application Specific Integrated Circuits (ASICs), or the like, configured with appropriate software and/or firmware. A computer readable storage medium (shown as memory circuit 22) stores data and computer readable program code that configures the processing circuit 21 to implement the techniques described above. Memory circuit 22 is a non-transitory computer readable medium, and can include various memory devices such as random access memory, read-only memory, and flash memory.

The control circuitry 20 receives inputs from the one or more switches 40. The control circuitry 20 also receives inputs from one or more sensors 50 positioned about the aircraft 100. As schematically illustrated in FIGS. 1 and 2, sensors 50 can be positioned to sense various aspects about the aircraft 100, such as but not limited to the environment within the interior of the vehicle 100, the exterior environment, and aspects about the operation of the vehicle 100. Interior aspects can include but are not limited to smoke or heat within the cabin 101, cargo hold 104, cockpit 105, or other interior space. Exterior aspects can include but are not limited to water (i.e., indicative of a water landing) and altitude. Aspects about the operation of the vehicle 100 can include but are not limited to deployment of the ram air turbine 51 (see FIG. 2), g-load sensing above a predetermined level, an aborted takeoff of the vehicle 100, an in-flight emergency, seat belt status activated (i.e., seat belts required for the passengers), turbulence, and landing gear deployment.

Sensors 50 can directly or indirectly signal the control circuitry 20. As illustrated in FIG. 4, one or more of the sensors 50 can send signals directly to the control circuitry 20. Additionally or alternatively, one or more sensors 50 can send signals to an operational system 60 which can then signal the control circuitry 20. The operational system 60 can include one or more processing circuits and memory circuits to control the operation of the aircraft 100. The operators of the vehicle 100 (e.g., pilots) can use the operational system 60 to plan and carryout the flight. The operational system 60 can receive signals from one or more sensors 50 indicating aspects of the operation of the vehicle 100. The operational system 60 can then forward these signals to the control circuitry 20.

In addition to sensors 50 detecting aspects about the aircraft 100 and/or flight, the operational system 60 can be configured to determine one or more of the operational aspects. For example, an aborted take-off can be detected based on one or more of the speed of the one or more engines 106, speed of the aircraft 100, and altitude of the aircraft 100. Other aspects that can be detected by the operational system 60 include but are not limited to status of seat-belts, landing gear deployment, and ram air turbine deployment. These calculated aspects are signaled by the operational system 60 to the control circuitry 20.

In one design as disclosed above, the operational system 60 controls the overall operation of the aircraft 100 (i.e., a flight control system). In another design, the operational system 60 is configured to operate a limited aspect of the operation of the vehicle 100. For example, the operational system 60 can include a control circuit and associated memory circuit that operates the hydraulic system that supplies hydraulic fluid to the components of the vehicle 100, including the landing gear. The operational system 60 can signal the landing gear deployment to the control circuitry 20 either directly or indirectly (e.g., through a flight control system that controls the overall operation of the aircraft 100).

Upon receiving a signal indicating the occurrence of an event, the control circuitry 20 can activate the one or more locks 30 to lock the storage bins 90. This prevents passengers from opening the storage bins 90 and taking time to collect their personal items when they should either be seated in their seat 102 or exiting the vehicle 100. The one or more switches 40 can be activated to over-ride the locks 30 during certain events.

Figure 5:
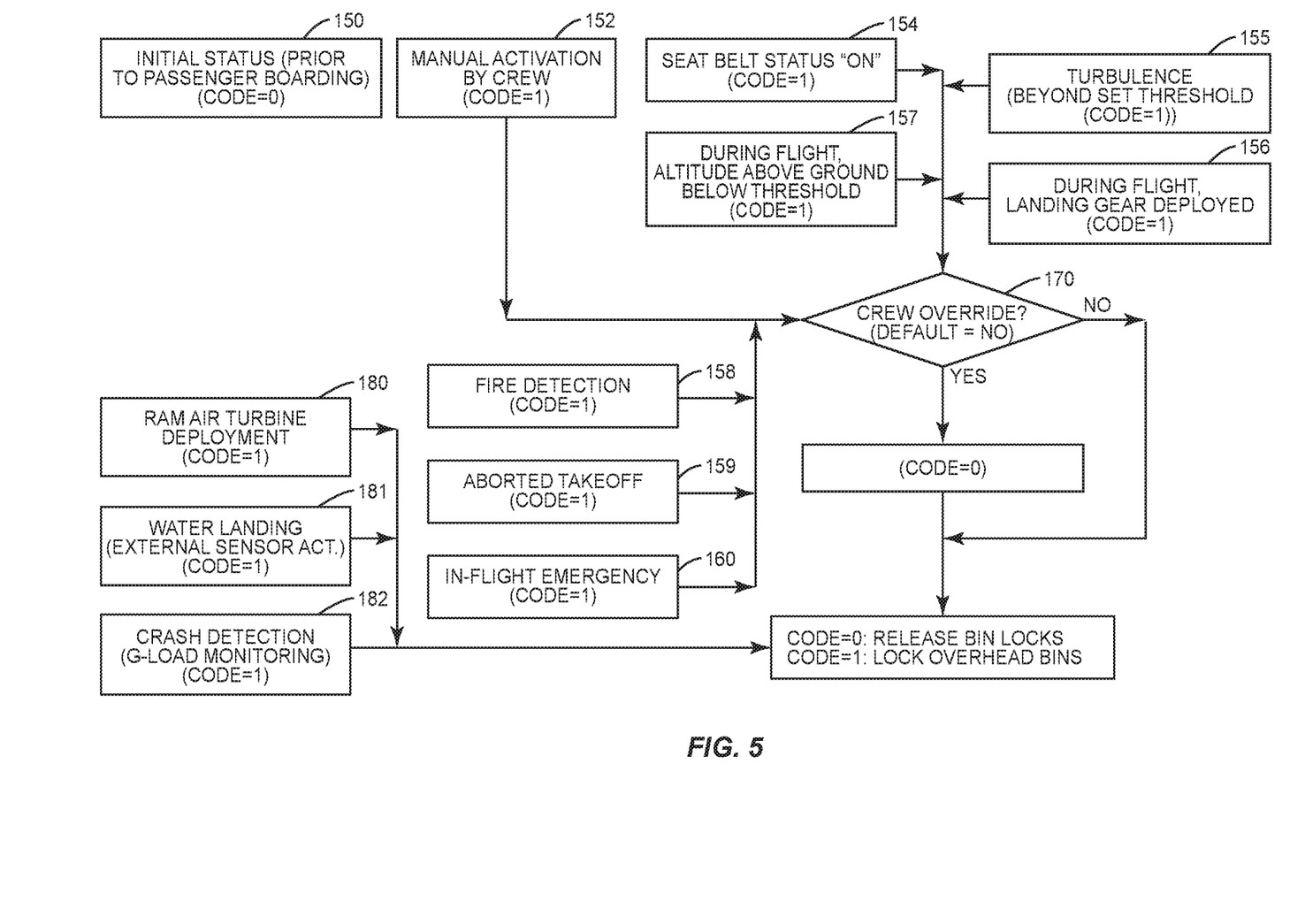
FIG. 5 is a schematic diagram of a method of controlling locks on storage bins of an aircraft.

FIG. 5 illustrates a schematic diagram of the functionality of the control circuitry 20 in controlling access to the storage bins 90. Initially, the locks 30 can be unlocked to provide access to the interior space 92 in the storage bins 90 (block 150). In one design, the locks 30 are in the unlocked position prior to passenger boarding. This provides for the passengers to open the storage bins 90 and store their personal items during boarding.

At some point thereafter, the locks 30 can be moved to the locked position. Events that can occur that move the locks 30 to the locked position can include a manual activation of the switch 40 by the crew (block 152). This can occur at various times, such as but not limited after the passengers have boarded and the exterior doors are closed, and when the pilot announces that the aircraft 100 is preparing for take-off. Events can also include: the seat-belt indicator being activated instructing passengers to remain in their seats 102 (block 154); turbulence detected by one or more sensors 50 (block 155); deployment of the landing gear during the flight indicating that the aircraft 100 is about to land (block 156); detecting that the aircraft 100 has dropped below a predetermined altitude (again indicating that the aircraft is preparing to land) (block 157); detecting smoke and/or a fire on the aircraft (block 158); an aborted take-off (block 159); and an in-flight emergency (block 160). The in-flight emergency can be input by the pilot into the operational system 60 or by the control circuitry 20 detecting a particular set of events that are programmed into the memory circuit 22 as an emergency.

As illustrated in FIG. 5, the control circuitry 20 can initially set the one or more locks 30 to a first setting (code=0) which positions the locks 30 in the unlocked position. Each of the events stated above can cause the control system to change the locks 30 to a second setting (code=1) which positions the locks 30 in the locked position. The second setting closes the locks 30 and prevents the storage bins 90 from being opened. The switch 40 can over-ride the setting and cause the control circuitry 20 to change the locks 30 back to the first setting (code=0) (block 170). This can occur when a crew member determines that it is acceptable for passengers to open the storage bins 90. This can occur for various reasons, including but not limited to a passenger needing medicine that is in the storage bin 90, the crew determining that a fire detection was a false alarm and there is no emergency, the aircraft 100 is no longer experiencing turbulence, and the seat belt status indicator has been returned to off.

Certain events cannot be overridden by the crew through the one or more switches 40. These can be more severe events that are indicative of more serious conditions. These events can include deployment of the ram air turbine 51 (block 180), detection of a water landing (block 181), and a crash detection (block 182). The water landing can be detected by one or more sensors 50 positioned on the exterior of the aircraft 100. Crash detection can be detected by one or more sensors 50 that detect the g-load experienced by the aircraft 100.

The occurrence of these more severe events causes the control circuitry 20 to lock the locks 30 and/or keep the locks 30 locked. This locks the storage bins 90 and prevents access by the passengers. The one or more switches 40 are not able to over-ride this second setting and unlock the locks 30.

The control circuitry 20 can set the one or more locks 30 based on signals received from the crew. This includes manual activation of one or more of the switches 40 by the crew (block 152). In one design, the crew can initially signal the control circuitry 20 through the one or more switches 40 for the one or more locks 30 to be unlocked (block 150), such as during a pre-flight preparation. The signals can also be received through interaction of the crew with the operational system 60, such as an in-flight emergency that is manually entered (e.g., pilot inputting status into the flight control system 60) (block 160).

Other events included in FIG. 5 are autonomous and performed by the control circuitry 20 without interaction by the crew. This can include turbulence (block 155), landing gear deployment (block 156), aircraft dropping below a predetermined threshold (block 157), fire/smoke detection (block 158), aborted takeoff (block 159), ram air turbine deployment (block 180), water landing (block 181), and crash detection (block 182).

In one design, the control circuitry 20 can autonomously change the one or more locks 30 from the locked position to the unlocked position. This can be based on signals from one or more sensors 50 and/or operational system 60 indicating that conditions have changed since the one or more locks 30 were moved to the locked position. For example, a sensor 50 such as an accelerometer that initially indicated turbulence can now detect that the turbulence has ended. Another example is a sensor 50 that initially detects smoke/fire resulting in locking the one or more locks 30. The sensor 50 later detects that there is no smoke/fire thus signaling the control circuitry 20 that moves the one or more locks 30 back to the unlocked position.

Figure 6:
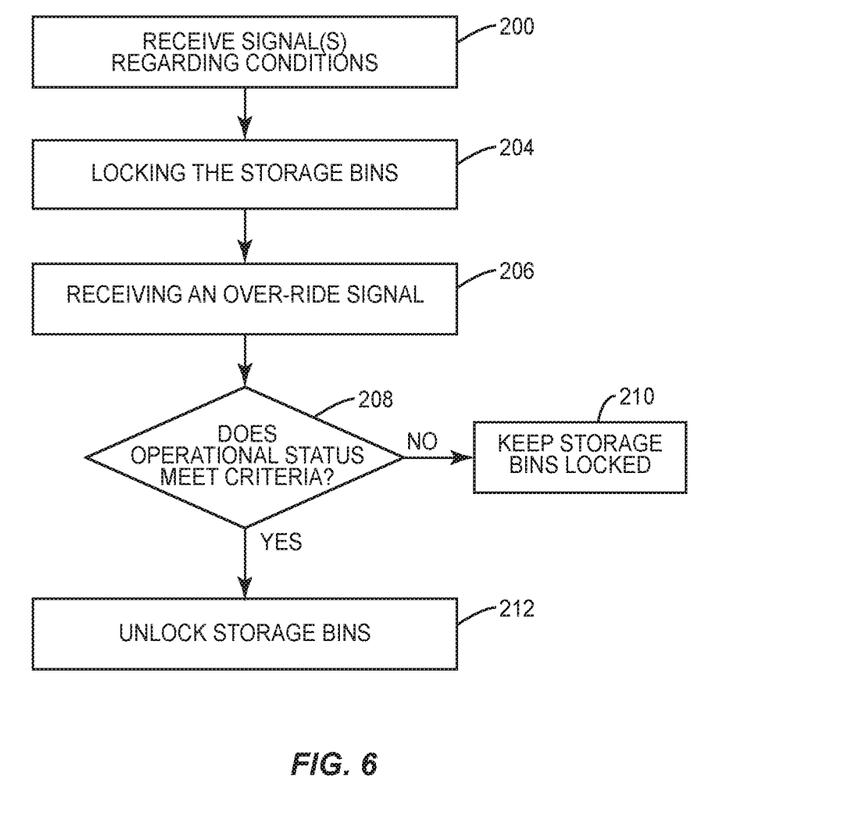
FIG. 6 is a schematic diagram of a method of controlling locks on storage bins of an aircraft.

FIG. 6 includes a method of controlling the one or more locks 30 on the storage bins 90. The control circuitry 20 receives one or more signals regarding conditions of the aircraft 100 (block 200). These signals can be autonomous or crew involved, and can include various aspects, including but not limited to the operation of the aircraft 100, internal conditions within the aircraft 100, and external conditions outside of the aircraft 100. Based on these signals, the control circuitry 20 determines the operational status of the aircraft 100 and whether an event has occurred and locks the one or more locks 30 (block 204).

While the one or more locks 30 are in the locked position, an over-ride signal is received (block 206). The signal can be received through the one or more switches 40 indicating the desire to unlock the storage bins 90. The control circuitry 20 determines whether the operational status provides for unlocking the one or more locks 30 (block 208). If the operational status of the aircraft 100 is set to an elevated level, the locks 30 remain in the locked position and access to the storage bins 90 is prevented (block 210). This can occur when the basis of the locked conditions indicate a serious condition with the aircraft 100, such as but not limited to ram air turbine deployment, water landing, and crash detection.

If the operational conditions allow, the control circuitry 20 can unlock the storage bins 90 (block 212). This can occur when the basis for the locked conditions are less severe and provide for the crew to make a judgment to unlock the storage bins 90.

Figure 7:
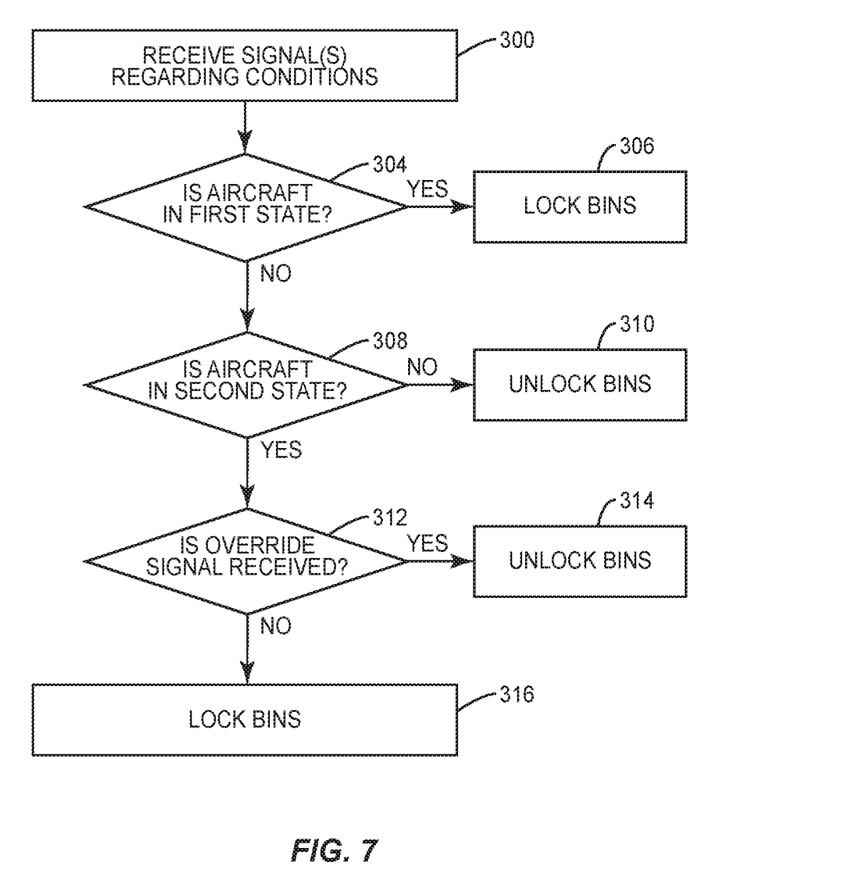
FIG. 7 is a schematic diagram of a method of controlling locks on storage bins of an aircraft.

FIG. 7 discloses another method of controlling access to the storage bins 90. The method includes the control system receiving one or more signals regarding the conditions of the aircraft (block 300). The control circuitry 20 determines the operational status of the aircraft 100 based on the one or more signals. If the control circuitry 20 determines that the aircraft is in a first state (block 304), the control circuitry 20 locks the one or more locks 30 (block 306). This can occur when a serious event occurs to the aircraft 100, such as but not limited to a water landing.

If the aircraft 100 is not in the first state, the control circuitry 20 determines whether the aircraft 100 is in a second state (block 308). The second state can include a less serious event has occurred to the aircraft 100, such as but not limited to turbulence and descending below a predetermined altitude as part of landing. If the aircraft 100 is also not in second state, the control circuitry 20 can unlock the storage bins 90 (or keep the storage bins 90 in the unlocked position). This can occur during normal operation of the aircraft 100.

If the control circuitry 20 determines a second state, the control circuitry 20 determines whether an over-ride signal has been received (block 312). The over-ride signal can be from a crew member and sent through a switch 40. If an over-ride signal is received, the control circuitry 20 unlocks the one or more locks 30 providing for access to the one or more storage bins 90 (block 314). If there is no over-ride received, the control circuitry 20 maintains the one or more locks 30 in the locked position (block 316).

In one design, one or more of the switches 40 is a master manual override switch that the crew can use to unlock each of the storage bins 90. This master manual override switch can be used to unlock the storage bins 90 regardless of the reason for originally locking the storage bins 90. For example, in the event of a failure of a sensor 50 or similar issue that causes the storage bins 90 to be locked, the master manual override switch can be used to unlock each of the storage bins 90.

The aspects have been described for use within the context of an aircraft 100, and specifically a commercial aircraft 100 configured to transport passengers. These aspects can also be used on other vehicles 100. Vehicles 100 can include but are not limited to other aircraft, spacecraft, rotorcraft, terrestrial vehicles, surface water borne vehicles, sub-surface water borne vehicles, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to control access to overhead storage bins in a moving vehicle, the system comprising:
   a lock configured to be selectively movable between a locked position to prevent access to an interior of the overhead storage bins and an unlocked position to allow access to the interior of the overhead storage bins;
   a switch positioned in a cabin of the vehicle;
   control circuitry configured to:
      determine an operational status of the vehicle while the vehicle is moving based on one or more sensors positioned on the vehicle;
      lock the overhead storage bins based on the operational status of the vehicle indicating a condition in which a passenger should not access the overhead storage bins;
      after locking the overhead storage bins and while the vehicle is moving, receive an override signal from the switch;
      in response to receiving the override signal from the switch, maintain the overhead storage bins in the locked position when the operational status indicates that the passenger should not access the overhead storage bins; and
      in response to receiving the override signal from the switch, unlock the overhead storage bins when the operational status does not meet the predetermined criteria.

2. The system of claim 1, wherein the one or more sensors are positioned outside of the cabin area where the overhead storage bins are located to sense one or more conditions of the vehicle and wherein the control circuitry receives signals from the sensors and determines the operational status of the vehicle.

3. The system of claim 1, wherein the control circuitry determines that the operational status meets the predetermined criteria upon determining the operational status of the vehicle as one of a power failure, a water landing, and a sudden decrease in speed.

4. The system of claim 1, wherein the control circuitry determines that the operational status does not meet the predetermined criteria upon determining the operational status of the vehicle as one of turbulence, landing gear deployment during flight, seat belt sign activation, and detection of a fire.

5. The system of claim 1, further comprising crew bins positioned in the vehicle that remain unlocked when the lock is in the locked position.

6. The system of claim 1, wherein the control circuitry is a flight control system that controls the vehicle and determines the operational status of the vehicle and transmits the operational status of the vehicle to the control circuitry.

7. A system to control access to overhead storage bins in a moving vehicle, the system comprising:
   a lock that is selectively movable between a locked position to prevent access to an interior of the overhead storage bins and an unlocked position to allow access to the interior of the overhead storage bins;

a switch positioned in a cabin of the vehicle;

control circuitry that determines whether an operational status of the vehicle that is moving is in a first state or a second state;

the control circuitry positions the lock in the unlocked position when the operational status is not in the first state or the second state;

the control circuitry positions the lock in the locked position when the operational status is in the first state regardless of an unlock input being received from the switch; and the control circuitry positions the lock in the unlocked position when the operational status is in the second state and the unlock input has been received from the switch.

8. The system of claim 7, further comprising sensors that detect aspects of the vehicle while it is moving and wherein the control circuitry receives signals from the sensors and determines the operational status of the vehicle, the sensors positioned to detect an exterior environment of the vehicle.

9. The system of claim 7, wherein the control circuitry determines that the operational status is in the first state upon determining an occurrence of a power failure, a water landing, and a sudden decrease in speed.

10. The system of claim 7, wherein the control circuitry determines that the operational status is in the second state upon determining an occurrence of turbulence, landing gear deployment during flight, seat belt sign activation, and detection of a fire.

11. The system of claim 7, wherein the control circuitry is a flight control system that controls the vehicle and determines the operational status of the vehicle and transmits the operational status to the control circuitry.

12. A method of selectively locking overhead storage bins on a vehicle that is moving, the method comprising:

receiving one or more inputs regarding conditions of the vehicle as the vehicle is moving, the one or more inputs received from one or more sensors;

based on the one or more input, determining an operational status of the vehicle of whether a passenger is able to stand to access the overhead storage bins;

while the vehicle is moving, locking the overhead storage bins based on the operational status of the vehicle and thereby preventing access to an interior of the overhead storage bins;

after locking the overhead storage bins, receiving an override input while the vehicle is moving;

in response to receiving the override input, maintaining the overhead storage bins locked when the operational status meets a predetermined criteria indicating that the passenger should not stand to access the overhead storage bins; and in response to receiving the override input, unlocking the overhead storage bins when the operational status does not meet the predetermined criteria thereby allowing access to the interior of the overhead storage bins.

13. The method of claim 12, further comprising initially unlocking the overhead storage bins prior to receiving the one or more inputs.

14. The method of claim 12, wherein receiving the one or more inputs regarding the operational status of the vehicle comprises receiving signals from sensors positioned away from the interior space within a cabin area of the vehicle indicative of the operational status of the vehicle.

15. The method of claim 12, wherein the predetermined criteria comprises determining a water landing.

16. The method of claim 12, wherein the predetermined criteria comprises determining a g-load force that is greater than a predetermined threshold.

17. The method of claim 12, wherein the predetermined criteria comprises determining a fire on board the vehicle.

18. The method of claim 12, wherein the predetermined criteria comprises determining detection of an aborted take-off.

19. The method of claim 12, wherein locking the overhead storage bins comprises signaling locks on the overhead storage bins to move to a locked orientation.

20. The method of claim 12, further comprising receiving the one or more inputs regarding an operational status of the vehicle from a flight control system that controls an overall operation of the vehicle.

* * * * *